(12) United States Patent
Yoon et al.

(10) Patent No.: US 11,610,168 B2
(45) Date of Patent: Mar. 21, 2023

(54) METHOD FOR ANALYZING RISK OF COOPERRATOR SUPPLY CHAIN

(71) Applicant: ISD Inc., Incheon (KR)

(72) Inventors: Dukchan Yoon, Guri-si (KR); Lisette Irene Brackel, Amsterdam (NL); Sooyoung Kim, Seoul (KR)

( * ) Notice: Subject to any disclaimer, the term of this patent is extended or adjusted under 35 U.S.C. 154(b) by 336 days.

(21) Appl. No.: 16/621,701

(22) PCT Filed: Dec. 2, 2019

(86) PCT No.: PCT/KR2019/016854
§ 371 (c)(1),
(2) Date: Dec. 12, 2019

(87) PCT Pub. No.: WO2020/130418
PCT Pub. Date: Jun. 25, 2020

(65) Prior Publication Data
US 2021/0326784 A1    Oct. 21, 2021

(30) Foreign Application Priority Data

Dec. 17, 2018  (KR) .................. KR10-2018-0162767

(51) Int. Cl.
*G06Q 10/0635*  (2023.01)
*G06Q 10/0835*  (2023.01)
(Continued)

(52) U.S. Cl.
CPC ..... *G06Q 10/0635* (2013.01); *G06F 18/2113* (2023.01); *G06F 18/29* (2023.01); *G06Q 10/0835* (2013.01)

(58) Field of Classification Search
CPC .......... G06Q 10/0635; G06Q 10/0835; G06Q 10/00; G06K 9/623; G06K 9/6296
(Continued)

(56) References Cited

U.S. PATENT DOCUMENTS 8,706,537 B1 *  4/2014  Young ................... G16H 50/30
                                                                  705/7.11
9,721,294 B1     8/2017  Vakil et al.
(Continued)

FOREIGN PATENT DOCUMENTS

JP    2005301973 A  * 10/2005  ............. G06Q 10/00
JP    2012216242 A  * 11/2012  ........... G06T 11/206
(Continued)

OTHER PUBLICATIONS

Dezhao Song "Building and Querying an Enterprise Knowledge Graph" IEEE Transactions on Services Computing, vol. 12, No. 3, May/Jun. 2019 (Year: 2017).*
(Continued)

*Primary Examiner* — Abdallah A El-Hage Hassan
(74) *Attorney, Agent, or Firm* — Park, Kim & Suh, LLC

(57) ABSTRACT

Disclosed is a method for analyzing a risk of a cooperator supply chain. The method calculates a risk score based on text data associated with an evaluation target company, provides visual information on the risk score of the evaluation target company through a bar graph, a tracking graph, a scatter plot graph, a network diagram, and a map diagram, and generates a chat room for managing a supply chain between the evaluation target company and the cooperator to support real-time communication.

11 Claims, 8 Drawing Sheets

(51) Int. Cl.
 G06F 18/20 (2023.01)
 G06F 18/2113 (2023.01)
(58) Field of Classification Search
 USPC .......................................................... 705/7.28
 See application file for complete search history.

(56) References Cited

U.S. PATENT DOCUMENTS

| | | | | |
|---|---|---|---|---|
| 2004/0132000 | A1* | 7/2004 | Dowdell | G06Q 10/10 |
| | | | | 434/350 |
| 2014/0210827 | A1* | 7/2014 | Alsbury | G06T 11/206 |
| | | | | 345/440.2 |
| 2015/0073929 | A1 | 3/2015 | Psota et al. | |
| 2015/0324542 | A1* | 11/2015 | Hoffman | G16H 50/30 |
| | | | | 705/2 |
| 2016/0171090 | A1* | 6/2016 | Schwartz | G06F 16/35 |
| | | | | 707/730 |
| 2016/0378932 | A1* | 12/2016 | Sperling | G06Q 40/08 |
| | | | | 705/3 |
| 2017/0178139 | A1* | 6/2017 | Gieseke | G06Q 30/0185 |
| 2018/0082237 | A1* | 3/2018 | Nagel | G06Q 10/06393 |
| 2018/0197128 | A1* | 7/2018 | Carstens | G06F 16/9024 |
| 2020/0286016 | A1* | 9/2020 | Singh | G06N 7/01 |

FOREIGN PATENT DOCUMENTS

| | | | | |
|---|---|---|---|---|
| JP | 2015-528946 | A | | 10/2015 |
| KR | 10-2014-0011720 | A | | 1/2014 |
| KR | 10-2014-0103409 | A | | 8/2014 |
| KR | 10-1599675 | B1 | | 3/2016 |
| KR | 10-1610907 | B1 | | 4/2016 |
| KR | 10-2016-0050241 | A | | 5/2016 |
| KR | 10-2017-004165 | A | | 1/2017 |
| KR | 10-2017-0004165 | A | | 1/2017 |
| KR | 10-1772655 | B1 | | 8/2017 |
| KR | 10-2017-0129347 | A | | 11/2017 |
| KR | 10-2018-0058073 | A | | 5/2018 |
| WO | WO-2012102226 | A1 * | 8/2012 | ....... G06F 17/30268 |

OTHER PUBLICATIONS

Patrick Uhr, Johannes Zenkert, and Madjid Fathi, "Sentiment Analysis in Financial Markets" University of Siegen Institute of Knowledge Based Systems Germany 2014. (Year: 2014).*

Affiliated companies CSR risk management, 2015-2016 LG Electronics Sustainability Report, p. 66-67.

* cited by examiner

METHOD FOR ANALYZING RISK OF COOPERRATOR SUPPLY CHAIN

CROSS-REFERENCE TO RELATED APPLICATIONS

This application is the National Stage filing under 35 U.S.C. 371 of International Application No. PCT/KR2019/016854, filed on Dec. 2, 2019, which claims the benefit of Korean Patent Application No. 10-2018-0162767, filed on Dec. 17, 2018, the contents of which are all hereby incorporated by reference herein in their entirety.

TECHNICAL FIELD

Embodiments of the inventive concept described herein relate to a method for analyzing a risk of a cooperator supply chain, and more particularly, relate to a method for analyzing a risk of a cooperator supply chain which evaluates a risk of a company based on a non-financial evaluation criterion and provides the result in the form of various visual information.

BACKGROUND ART

With the development of the Internet, big data analysis has been developed. Data mining is the process of discovering useful correlations hidden among many data to extract executable information in the future and use the information in decision making. That is, the data mining is to search for a pattern and a correlation hidden in data and discover information as if to find a vein. In this case, information discovery, which is the process of searching for a useful pattern and correlation by applying advanced statistical analysis and modeling techniques to data, is a key technology in database marketing.

In recent years, such data mining technology has been introduced to evaluate the value of a company, and attempts have been made to evaluate the value or risk of a corresponding company by synthetically taking into account various data scattered on the Internet.

However, according to the related art, only financial information such as debt, operating profit, holding assets, and the like is used to evaluate a company, so that there is a limitation that it cannot evaluate non-financial aspects such as morality, social contribution, ethical management of the company, and the like.

DISCLOSURE

Technical Problem

Embodiments of the inventive concept provide a method for analyzing a risk of a cooperator supply chain which is capable of evaluating the risk of a company by using various information including financial and non-financial information, converting and providing the evaluation result into various visual information, and providing a real-time communication service between the company and a cooperator when a specific issue occurs, and a recording medium for executing the same.

Objects of the inventive concept may not be limited to the above, and other objects will be clearly understandable to those having ordinary skill in the art from the following disclosures.

Technical Solution

According to an exemplary embodiment, a method for analyzing a risk of a cooperator supply chain includes calculating a risk score of each of an evaluation target company and a plurality of cooperators related to the evaluation target company based on text data related to the evaluation target company, generating a bar graph for comparing the risk score of the evaluation target company with an average risk score of the cooperator, generating a tracking graph indicating a change trend in the risk score of each of the evaluation target company and the plurality of cooperators, extracting a feature point on the tracking graph, and matching external information indicating a feature point occurrence cause to the feature point, and creating a chat room for managing a supply chain of the evaluation target company and the cooperator, and controlling the bar graph and the tracking graph to be displayed in a specified area of the chat room in real time.

The generating of the bar graph may include setting a height of the bar graph corresponding to a size of the risk score of the evaluation target company, and displaying the risk score of the cooperator at a specified height of the bar graph corresponding to the size of the risk score of the cooperator.

The method may further include, when a user selects one tracking graph from a plurality of tracking graphs generated for each of the evaluation target company and the plurality of cooperators, changing at least one of color, brightness, or a thickness of the selected tracking graph.

The method may further include, when a user selects one feature point from a plurality of feature points formed in the tracking graph, displaying the external information matching the selected one feature point in a specified area.

The displaying of the external information may include, when the user sequentially selects the plurality of feature points, continuously displaying different external information matched for each selected feature point.

The method may further include generating a network diagram displayed in which a plurality of keywords related to the evaluation target company or the cooperator are displayed in a hierarchical tree structure, and displaying a keyword belonging to a specific layer among the plurality of keywords constituting the network diagram based on input information input from a user.

The generating of the network diagram may include calculating the risk score for each of the keywords based on the text data, and generating the network diagram in which the plurality of keywords are displayed in the hierarchical structure according to the calculated risk score.

The displaying of the keyword may include extracting a first keyword selected by the user, arranging the extracted first keyword at a specified center point, and arranging and displaying a plurality of sub keywords related to the first keyword in a ring shape based on the center point.

The displaying of the keyword may include, when a second keyword which is one of the sub keywords, is selected from the plurality of sub keywords by the user, arranging and displaying other sub keywords related to the second keyword in a ring shape based on the second keyword while moving and arranging the second keyword to the center point, and connecting and displaying the first and second keywords in a chain form while moving and arranging the first keyword to a specified outside portion in the ring shape such that history of the plurality of keywords selected by the user is displayed.

The method may further include displaying an event occurrence location related to the evaluation target company on a previously stored map data based on the text data, and displaying a risk score according to the text data at the displayed location.

The generating of the chat room may include, when specific text data is uploaded from a terminal of a first user associated with the evaluation target company to the chat room, displaying the specific text data in a first area of the chat room, analyzing the specific text data displayed in the first area to extract a target cooperator related to an issue according to the specific text data among the plurality of cooperators, transmitting temporary address information for temporary access to the chat room through a terminal of a second user associated with the extracted target cooperator. In addition, the controlling of the displaying of the bar graph and the tracking graph may include, when a specific word included in the specific text data is selected through the terminal of the first or second user, displaying the bar graph and the tracking graph associated with the selected specific word in a second area.

According to an exemplary embodiment, there is provided a computer readable recording medium having a computer program recorded thereon for performing a method of analyzing a risk of a cooperator supply chain according to the inventive concept.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
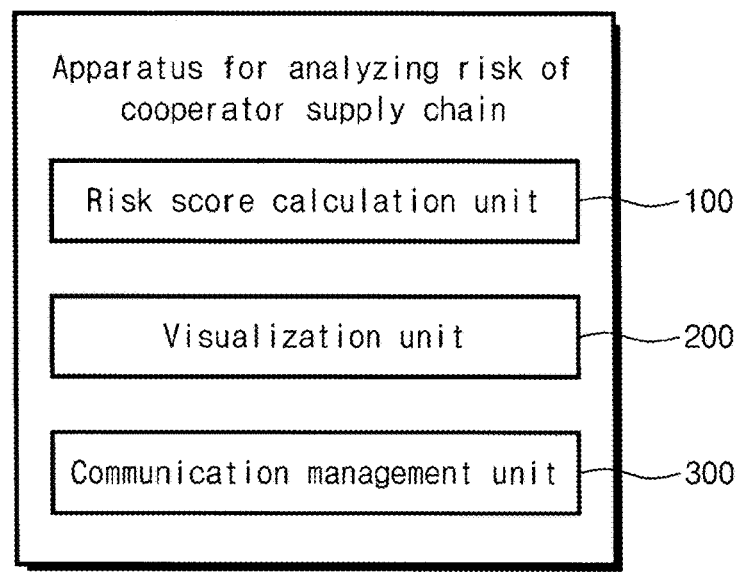
FIG. 1 is a block diagram illustrating a schematic configuration of an apparatus for analyzing a risk of a cooperator supply chain according to an embodiment of the inventive concept.

In the following detailed description, reference is made to the accompanying drawings that show, by way of illustration, specific embodiments in which the inventive concept may be practiced. These embodiments are described in sufficient detail to enable those skilled in the art to practice the inventive concept. It is to be understood that the various embodiments of the inventive concept, although different, are not necessarily mutually exclusive. For example, a particular feature, structure, or characteristic described herein in connection with one embodiment may be implemented within other embodiments without departing from the spirit and scope of the inventive concept. In addition, it is to be understood that the location or arrangement of individual elements within each disclosed embodiment may be modified without departing from the spirit and scope of the inventive concept. The following detailed description is, therefore, not to be taken in a limiting sense, and the scope of the inventive concept is defined only by the appended claims, appropriately interpreted, along with the full range of equivalents to which the claims are entitled. In the drawings, like numerals refer to the same or similar functionality throughout the several views.

Hereinafter, with reference to the drawings will be described in detail preferred embodiments of the inventive concept.

FIG. 1 is a block diagram illustrating a schematic configuration of an apparatus 1 for analyzing a risk of a cooperator supply chain according to an embodiment of the inventive concept.

The apparatus 1 for analyzing a risk of a cooperator supply chain according to the inventive concept may crawl various data having information about a specific company (hereinafter, referred to as an evaluation target company) detected by the user to evaluate risks for an evaluation target company and the supply chain formed between the evaluation target company and a cooperator according to environment, social and governance (ESG).

The apparatus 1 for analyzing a risk of a cooperator supply chain converts the evaluation result into various visual information and provide it to the user. When a specific issue occurs, the apparatus 1 may support real-time communication between the evaluation target company and the cooperator forming a supply chain with the evaluation target company.

In detail, the apparatus 1 for analyzing a risk of a cooperator supply chain according to an embodiment of the inventive concept includes a risk score calculation unit 100, a visualization unit 200 and a communication management unit 300.

In this case, the apparatus 1 for analyzing a risk of a cooperator supply chain according to the inventive concept may have mobility or be fixed. For example, the apparatus 1 for analyzing a risk of a cooperator supply chain may be in the form of a server or an engine, and may be referred to as a term such as a smartphone, a device, an apparatus, a terminal, a user equipment (UE), a mobile station (MS), a wireless device, a handheld device, or the like.

In addition, the apparatus 1 for analyzing a risk of a cooperator supply chain may be implemented with more or fewer components than those shown in FIG. 1. Alternatively, in the apparatus 1 for analyzing a risk of a cooperator supply chain, at least two components of the risk score calculation unit 100, the visualization unit 200 and the communication management unit 300 may be integrated into one component which performs complex functions. Hereinafter, the above-described components will be described in detail.

The risk score calculation unit 100 may calculate a risk score numerically indicating a degree of risk of an evaluation target company based on various data collected by the apparatus 1 for analyzing a risk of a cooperator supply chain.

To this end, the apparatus 1 for analyzing a risk of a cooperator supply chain may collect text data in various manners. For example, the apparatus 1 for analyzing a risk of a cooperator supply chain may visit various web pages, such as portal sites, media sites, SNSs, and the like to collect various text data such as news, and classify and manage them by company.

In this case, the risk score calculation unit 100 may calculate a risk score for the evaluation target company by analyzing text data related to the evaluation target company when a process of evaluating a specific company (evaluation target company) is performed. For example, the risk score calculation unit 100 may classify one piece of text data by word or morpheme, and input the text data into a pre-trained artificial neural network to infer the meaning of the text data. The risk score calculation unit 100 may calculate a risk level for each text data based on the inference result, and calculate the risk score for the evaluation target company by combining the calculation results.

As a similar manner, the risk score calculation unit 100 may also calculate a risk score for a cooperator associated with the evaluation target company.

In this case, the cooperator may be defined as a company that is closely related to the evaluation target company. For example, the cooperator may include a company that delivers materials to the evaluation target company, or manufactures components according to the request of the evaluation target company. There is a supply chain for logistics, transfer of resources, and distribution between the evaluation target company and the cooperator. Such a risk of a supply chain may be caused by various external factors.

Therefore, the risk score calculation unit 100 according to the inventive concept may calculate a risk score for analyzing the risk of the supply chain in various ways.

The visualization unit 200 may perform a series of processes for expressing the generated risk score in various visual effects. In detail, the visualization unit 200 may provide the evaluation result of the evaluation target company as visual information through a bar graph, a tracking graph, a scatter plot graph, a network diagram, and the map diagram. In this regard, it will be described with reference to FIG. 2.

Figure 2:
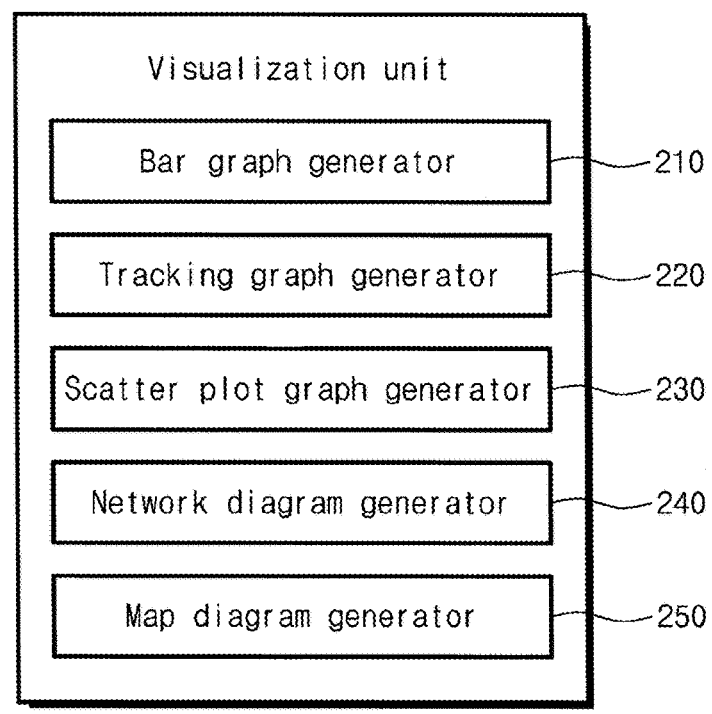
FIG. 2 is a block diagram illustrating a specific configuration of the visualization unit of FIG. 1.

FIG. 2 is a view illustrating a specific configuration of the visualization unit 200 of FIG. 1.

Specifically, the visualization unit 200 may include a bar graph generator 210, a tracking graph generator 220, a scatter plot graph generator 230, a network diagram generator 240, and a map diagram generator 250.

The bar graph generator 210 may represent the risk score of the evaluation target company in the form of a bar graph. In this regard, it will be described with reference to FIG. 3.

Figure 3:
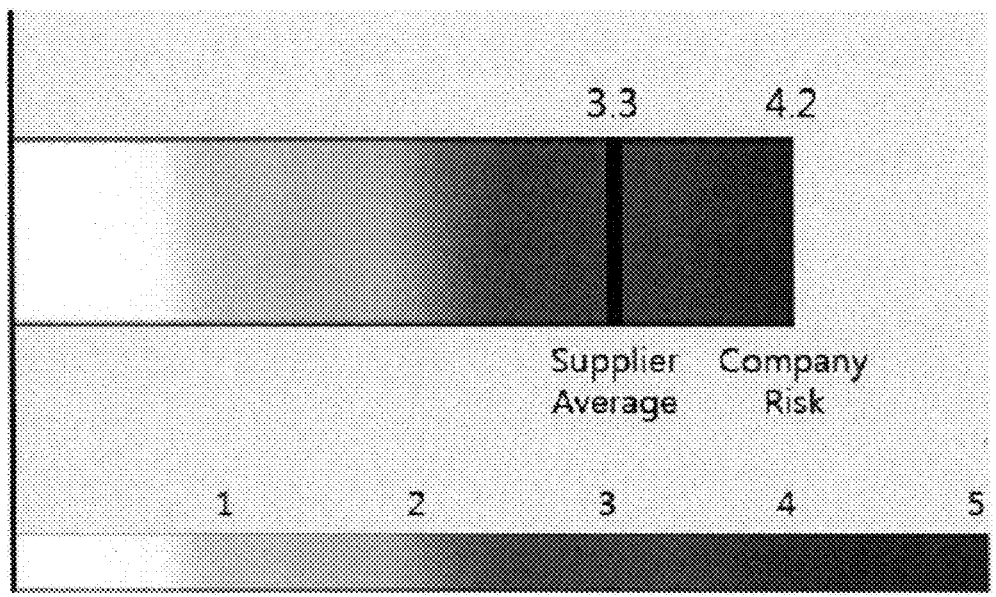
FIGS. 3 to 8 are views illustrating examples of various visual information generated from the visualization unit of FIG. 1.

FIG. 3 is a view illustrating an example of a bar graph generated by the bar graph generator 210.

The bar graph generator 210 may convert the risk score of the evaluation target company into a bar graph. That is, the bar graph generator 210 may set the height (4.2) of the bar graph according to the size of the risk score of the evaluation target company. The bar graph generator 210 may express the risk score in five stages (Extreme, Very High, High, Medium, and Low) and the score to express the degree of risk by the length and color distinction on the bar graph.

In this case, the bar graph generator 210 may display the risk score of the cooperator for the evaluation target company together with the bar graph, such that it is possible to compare the risk score of the cooperator with the risk score of the evaluation target company. In detail, the bar graph generator 210 may calculate an average risk score of the cooperator and display a graphic representing the calculated average risk score on the previously generated bar graph.

For example, when the average risk score of the cooperator is 3.3 as shown, a graphic (Supplier Average) representing the average risk score of the cooperator may be generated at a specified position in the bar graph of the evaluation target company having a height of 4.2 points.

The tracking graph generator 220 may generate a tracking graph indicating a change trend of the risk score for each of the evaluation target companies and the plurality of cooperators. In this regard, it will be described with reference to FIG. 4.

Figure 4:
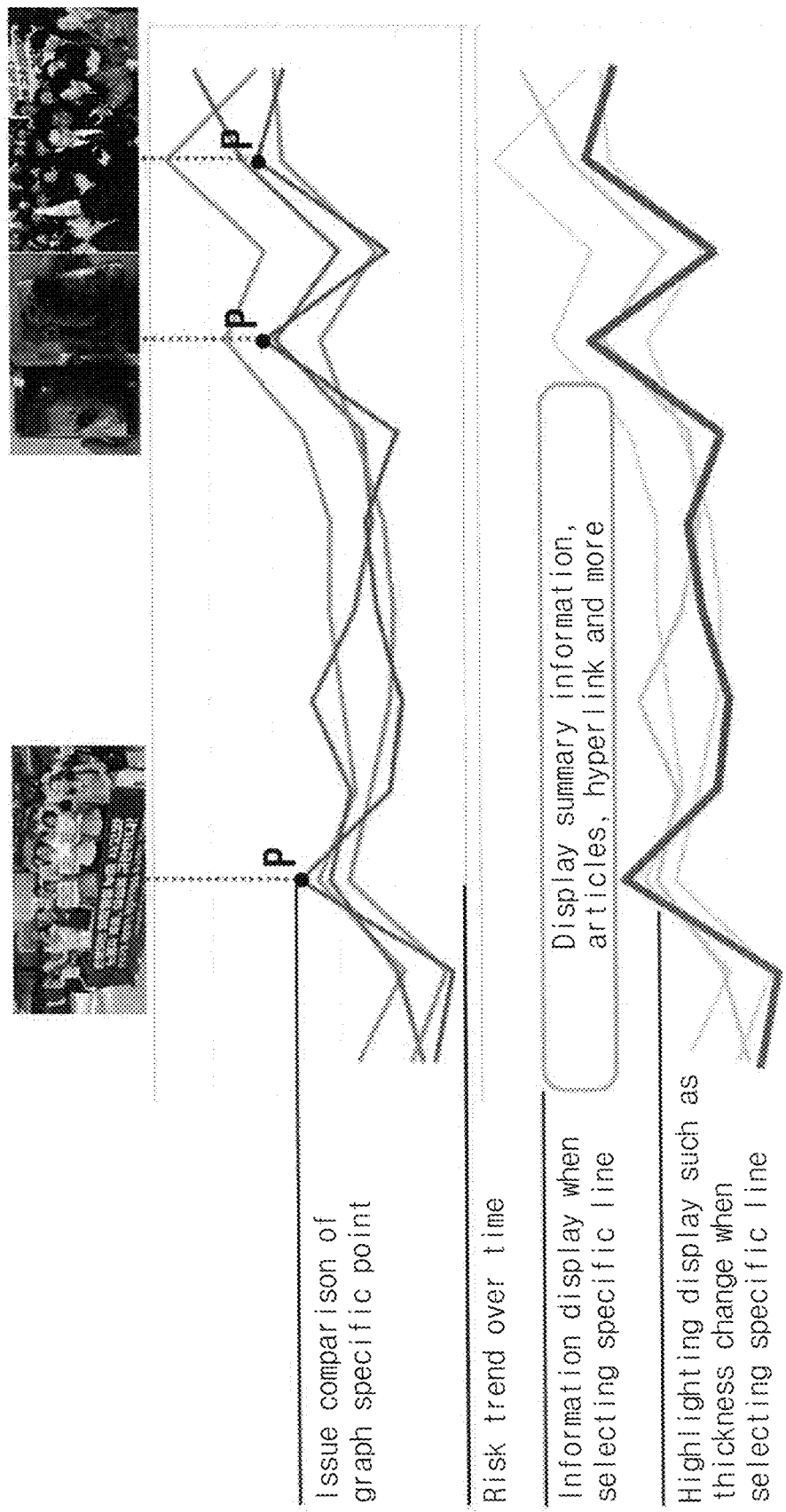

FIG. 4 is a view illustrating an example of a tracking graph generated by the tracking graph generator 220.

As shown, the tracking graph generator 220 may generate a tracking graph indicating changes in the risk scores of the evaluation target company and its cooperators over time.

In this case, the tracking graph generator 220 may control to produce various effects on the tracking graph according to an input signal received from a user.

As an example, when the user selects one from a plurality of tracking graphs generated for the evaluation target company and the plurality of cooperators, the tracking graph generator 220 may control the selected tracking graph to be changed in at least one of the color, brightness or thickness of the selected tracking graph.

In this state, the tracking graph generator 220 may display external information related to the selected specific tracking graph together.

To this end, the tracking graph generator 220 may generate at least one feature point 'P' on each tracking graph. The feature point may be generated by various criteria. For example, the tracking graph generator 220 may set the feature point 'P' in the section in which the amount of change in the slope in a specific section exceeds a preset threshold value while observing a change in the slope of each small section of the tracking graph. In the illustrated embodiment, although the feature point is set in only one tracking graph for the purpose of convenient description, the feature points may be substantially set in all the tracking graphs.

When a user selects one feature point from a plurality of feature points formed in the tracking graph, the tracking graph generator 220 may display external information matched to the selected feature point in a specified area. In this case, the external information may be defined as information such as an image, a video, and the like related to the corresponding issue.

In addition, when a plurality of feature points are sequentially selected by the user, the tracking graph generator 220 may control to continuously display the different external information matched for each selected feature point. In the illustrated embodiment, when the user sequentially selects three feature points, the external information for each feature point is controlled to be displayed continuously over time, so that the user may easily understand what caused the risk of the company to change based on only external information related to the feature point.

The scatter plot graph generator 230 may generate a scatter plot graph by using the risk scores of the cooperators managed by the evaluation target company. In this regard, it will be described with reference to FIG. 5.

Figure 5:
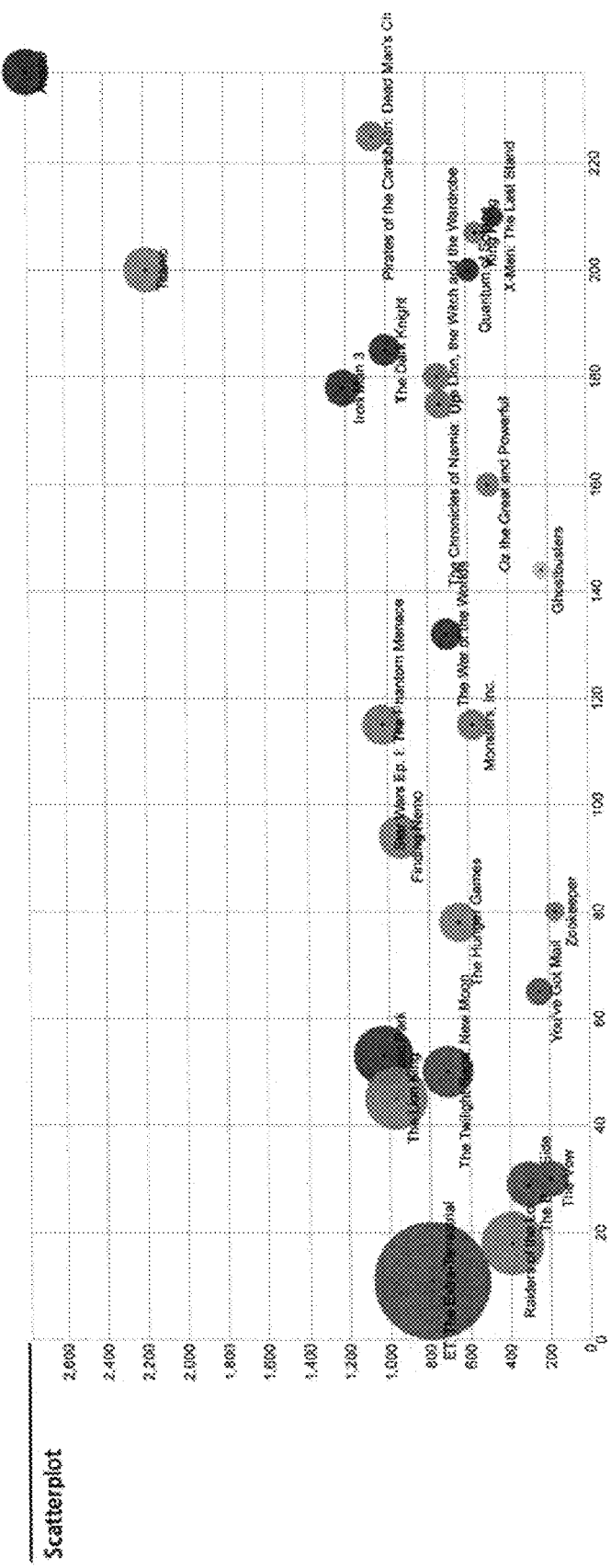

FIG. 5 is a view illustrating an example of a scatter plot graph generated by the scatter plot graph generator 230.

Specifically, the scatter plot graph generator 230 may generate a scatter plot graph showing the risk change trend from the past to the present for each cooperator as the size and area. The scatter plot graph generator 230 may highlight and display a specific area selected by the user, or may give effects such as thickness of an outline, color change, and the like. In addition, when a specific area is selected, summary information about the cooperator, information about related articles, and the like may be displayed in the form of a hyperlink.

The network diagram generator 240 may generate a network diagram for hierarchically displaying a plurality of keywords related to an evaluation target company or a cooperator.

First, the network diagram generator 240 may generate a network diagram in which a plurality of keywords form a hierarchical tree structure by dividing the keywords into upper categories or lower categories for other keywords according to the importance of the keywords.

In this case, the network diagram generator 240 may set the upper or lower relationships between the plurality of keywords based on various criteria.

As an example, the network diagram generator 240 may calculate a risk score for specific text data, and calculate a risk score calculated for words included in the corresponding text data. The network diagram generator 240 may calculate an average risk score of a specific word based on risk scores for different text data including a specific word. By such a manner, the network diagram generator 240 may assign an average risk score for every keyword associated with the evaluation target company.

The network diagram generator 240 may generate a network diagram in which a plurality of keywords are displayed in a hierarchical structure according to the size of the average risk score calculated for each keyword.

As another example, the network diagram generator 240 may group a plurality of keywords by hierarchy according to a hierarchy (category) set by a manager of the apparatus 1 for analyzing a risk of a cooperator supply chain.

Thereafter, the network diagram generator 240 may control to display a keyword belonging to a specific category among a plurality of keywords constituting the network diagram according to a user's manipulation. In this regard, it will be described with reference to FIG. 6.

Figure 6:
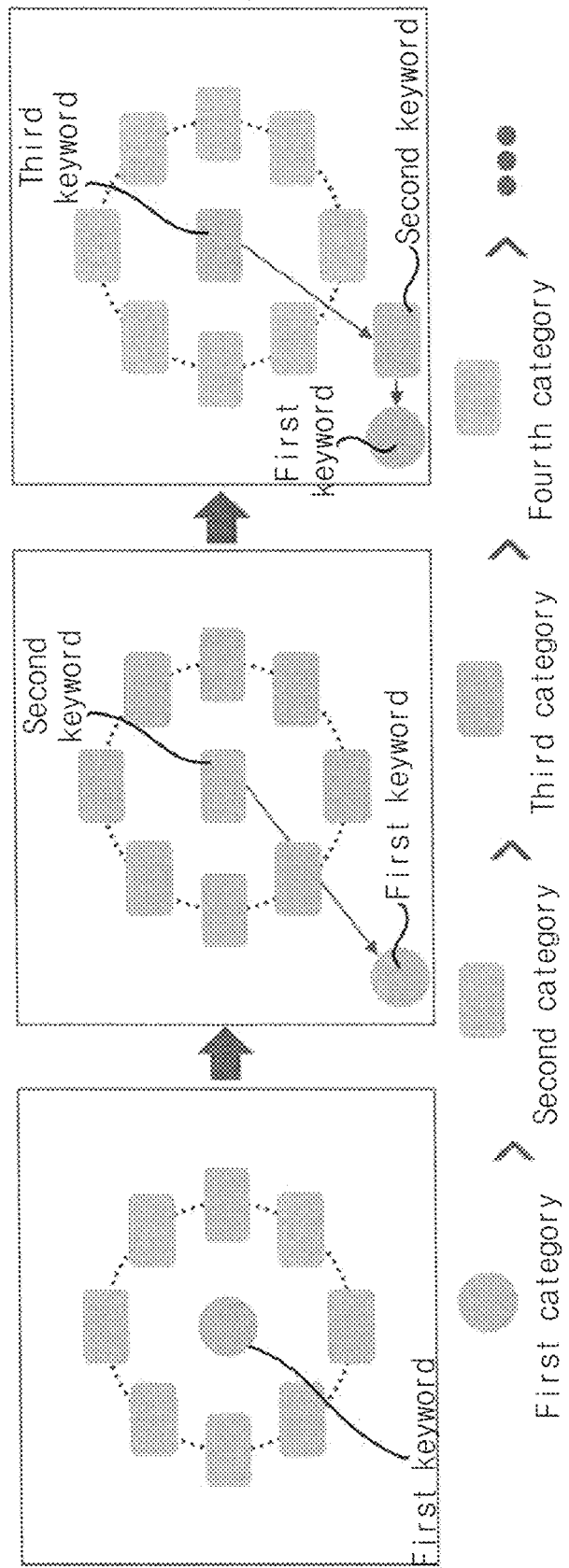

FIG. 6 is a diagram illustrating an example of a network diagram output by the network diagram generator 240 is shown.

The network diagram generator 240 may arrange the first keyword selected by the user at a preset center point. The network diagram generator 240 may extract a second keyword group associated with the selected first keyword and belonging to a lower layer of the first keyword with reference to the previously established network diagram. As illustrated in the left diagram of FIG. 6, the network diagram generator 240 may arrange the extracted second keyword group (second category) in the form a ring shape around the first keyword.

In addition, when it is determined that a user selects the second keyword from the second keyword group (second category), the network diagram generator 240 may move and arrange the second keywords at the center point. At the same time, the network diagram generator 240 may arrange and display a plurality of different sub-keyword groups (third category) related to the selected second keyword in a ring shape around the second keyword.

In this process, the network diagram generator 240 may display the first and second keywords in a chain form while moving the first keyword to a specified outer portion in a ring shape such that the history of the plurality of keywords selected by the user is displayed.

Accordingly, the user may intuitively navigate a plurality of keywords from the top category to the bottom category, and as the history of the keywords selected by the user is displayed separately, the user may intuitively understand how the keywords currently displayed are extracted by the keyword selection.

The map diagram generator 250 may display a variety of information according to the risk information calculated on the map data for a specific region and provide it as visual information. In this regard, it will be described with reference to FIG. 7.

Figure 7:
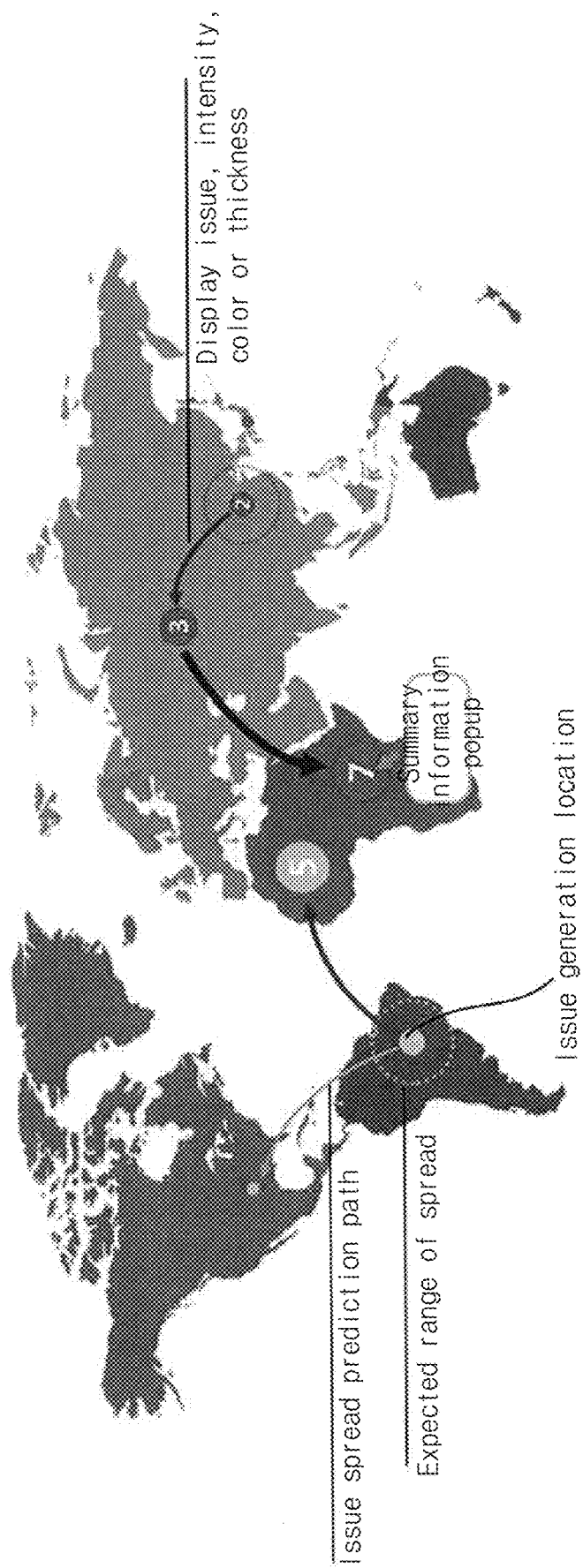

FIG. 7 is a view illustrating an example of a map diagram generated by the map diagram generator 250.

The map diagram generator 250 may display an event occurrence location (issue occurrence location) related to the evaluation target company on the map data stored in advance on the basis of the text data.

The map diagram generator 250 may display the risk score according to the text data at the displayed location. For example, the map diagram generator 250 may control risk information or the summery information on the issue to be displayed in a pop-up form when the user selects the corresponding location while only the location is normally displayed on the map data.

In addition, the map diagram generator 250 may analyze the event occurrence point and the text information on the evaluation target company or cooperator associated with the corresponding event and display the range expected to be affected by the issue based on the issue occurrence point.

Meanwhile, the map diagram generator 250 may predict and display an issue (event) spreading path. For example, the map diagram generator 250 may analyze news data on natural disasters such as drought occur in the South American region, and display the issue occurrence location in the corresponding region on the map data. In this case, when the map diagram generator 250 analyzes the corresponding news data and other text data related thereto to obtain the information that the crops produced from the issue occurrence area are exported to a specific area 5 of Africa, the map diagram generator 250 may select the Africa area 5 as the issue spreading route and create an arrow indicating from South America to the Africa area. In this process, the map diagram generator 250 may calculate the risk score of the news data, and set the color or thickness of the issue spreading route according to the size of the risk score. Therefore, the user may easily obtain information on the degree of risk and the spread range and route of the risk by region even by looking only at the map diagram generated by the map diagram generator 250.

As described above, the visualization unit 200 according to the inventive concept may provide, as visual information, the risk score calculated for each of the evaluation target company and the cooperator associated with the evaluation target company through a bar graph, a tracking graph, a scatter plot graph, a network diagram and a map diagram.

The communication management unit 300 may generate a chat room for managing the supply chain of the evaluation target company and the cooperator by using various graphic information generated by the visualization unit 200. In this regard, it will be described with reference to FIG. 8.

Figure 8:
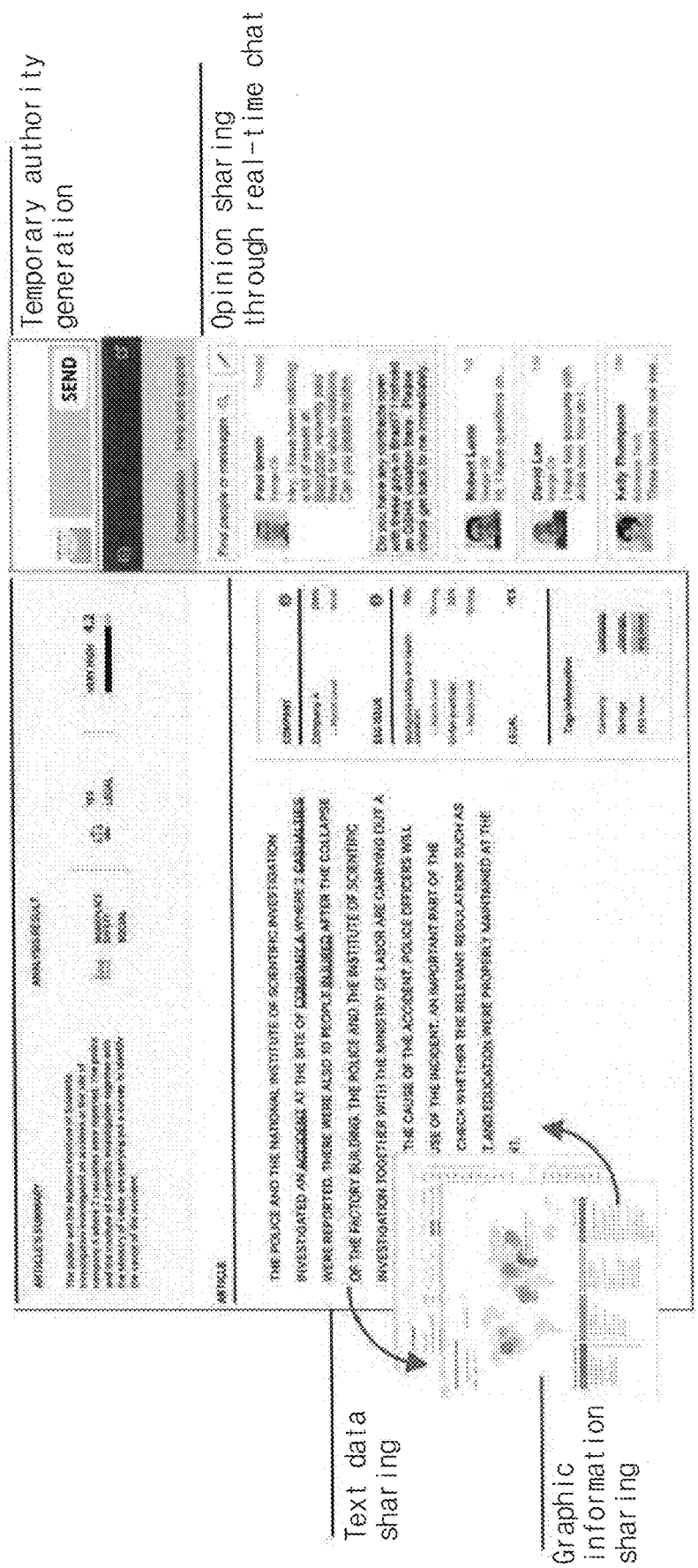

FIG. 8 is a view illustrating a specific example of a chat room generated by the communication management unit 300.

The communication management unit 300 may analyze the risk score of the evaluation target company and the text data related to the evaluation target company to determine whether an issue related to the evaluation target company occurs. For example, when the calculated risk score is equal to or greater than a preset reference value, or a preset issue occurrence keyword is included in specific text data, the communication management unit 300 may determine that an issue for the corresponding evaluation target company has occurred.

In this case, the communication management unit 300 may generate a chat room in a specified area and transmit address information for access to the chat room generated to a terminal possessed by a user (hereinafter, referred to as a first user) associated with the evaluation target company.

At the same time, the communication management unit 300 may transmit an address for access to the chat room to a terminal possessed by a user (hereinafter, referred to as a second user) associated with the cooperator related to the issue among all issued cooperators related to the evaluation target company.

For example, the communication management unit 300 may transmit a temporary ID or an access link of the chat room to a terminal of the corresponding cooperator when an e-mail or contact information of the cooperator is input from the first user in the chat window.

As another example, the communication management unit 300 may automatically extract a target cooperator associated with a generated issue according to specific text data by analyzing the text data related to the generated issue among a plurality of cooperators. That is, the communication management unit 300 may search for the cooperator associated with a word included in the text data by itself, and automatically select and invite a user (the second user) of the cooperator related to an issue even if the first user does not input additional information.

Thereafter, the communication management unit 300 may support real-time communication (chat, video call, and the like) between the first user and the at least one second user. In this case, the communication management unit 300 may control the text data related to an issue occurring in the first area of the chat window to be displayed for smooth communication.

In this process, when the communication management unit 300 determines that a specific word is selected from the text data displayed in the first area by the first or second user, the communication management unit 300 may control graphic information related to the selected specific word to be displayed together. That is, the communication management unit 300 controls at least one of various graphic information generated by the visualization unit 200 to be displayed in the second area in order to visually express the selected word, such that the first and second users smoothly communicate with each other, and text data and graphic information shared in the chat window are changed or modified to make a quick discussion for resolution of the issue.

As described above, the apparatus 1 for analyzing a risk of a cooperator supply chain according to the inventive concept may calculate a risk score based on text data associated with an evaluation target company, and provide visual information on the risk score of the evaluation target company through a bar graph, a tracking graph, a scatter plot graph, a network diagram, and a map diagram. In addition, the apparatus 1 may support real-time communication by generating a chat room for managing the supply chain between the evaluation target company and the cooperator, so that the risk information on the evaluation target company is provided in various visual forms and at the same time, the supply chain between the evaluation target company and the cooperators is effectively managed.

Figure 9:
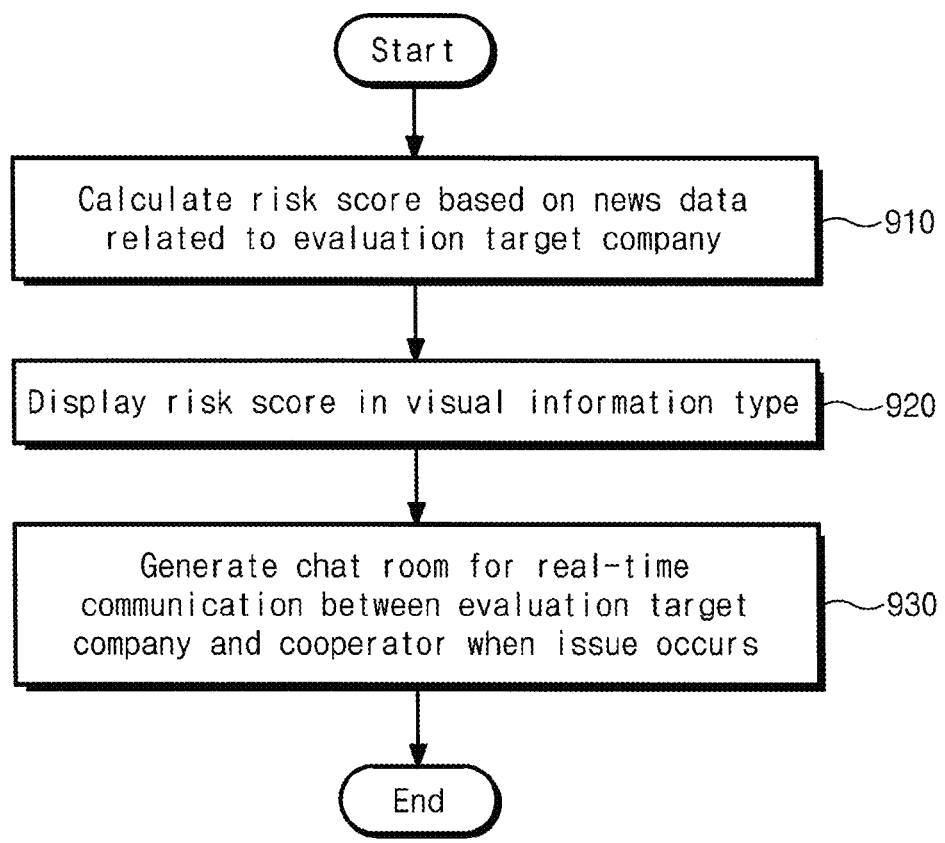
FIG. 9 is a flowchart illustrating a method for analyzing a risk of a cooperator supply chain according to an embodiment of the inventive concept.

FIG. 9 is a flowchart illustrating a method for analyzing a risk of a cooperator supply chain according to an embodiment of the inventive concept.

The method for analyzing a risk of a cooperator supply chain according to the inventive concept may be performed by the apparatus 1 for analyzing a risk of a cooperator supply chain according to the inventive concept described above. To this end, the apparatus 1 for analyzing a risk of a cooperator supply chain according to the inventive concept may be pre-installed with an application (software) for performing each operation constituting the method for analyzing a risk of a cooperator supply chain described below. For example, a platform for the method for analyzing a risk of a cooperator supply chain according to the inventive concept may be pre-installed on a smartphone of a user in the form of an application, and the user may execute the application installed on the smartphone to receive various services provided by the method for analyzing a risk of a cooperator supply chain according to the inventive concept.

In operation 910, the apparatus 1 for analyzing a risk of a cooperator supply chain may calculate a risk score for each of the evaluation target company and a plurality of cooperators related to the evaluation target company based on text data related to the evaluated target company.

In operation 920, the apparatus 1 for analyzing a risk of a cooperator supply chain may convert the calculated risk score into various types of visual information and display the visual information. That is, the apparatus 1 for analyzing a risk of a cooperator supply chain may provide the result of evaluating the evaluation target through a bar graph, a tracking graph, a scatter plot graph, a network diagram, and a map diagram as visual information.

In addition, in operation 930, the apparatus 1 for analyzing a risk of a cooperator supply chain may provide communication means for managing the supply chain between the evaluation target company and the cooperator. The apparatus 1 for analyzing a risk of a cooperator supply chain may create a chat window to support mutual communication between the cooperator and the evaluation target company. In this operation, the apparatus 1 may control the previously generated graphic information related to the evaluation target company to be displayed in the chat window, thereby smoothly communicating with each other.

Because the details of operations 910, 920, and 930 have been described above with reference to FIGS. 1 to 8, repeated descriptions thereof will be omitted.

As described above, the technology of providing the method for analyzing a risk of a cooperator supply chain may be implemented with an application or program instructions which may be executed through various computer components and may be recorded in computer-readable media. The computer-readable media may also include, alone or in combination with the program instructions, data files, data structures, and the like.

The program instructions recorded in the computer-readable media may be designed and configured specially for the inventive concept or be known and available to those skilled in computer software.

Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like.

Program instructions include both machine codes, such as produced by a compiler, and higher level codes that may be executed by the computer using an interpreter. The hardware devices may be configured to act as one or more software modules to perform the operations of the inventive concept, or vice versa.

According to the inventive concept, a user may analyze the risk of the evaluation target company through a bar graph, a tracking graph, a network diagram, a map diagram, and the like in various ways, and when a specific issue occurs, visual data may be provided during real-time communication between the evaluation target company and the cooperator, thereby ensuring smooth communication.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for analyzing a risk of a cooperator supply chain, the method comprising:
    calculating a risk score of each of an evaluation target company and a plurality of cooperators related to the evaluation target company based on text data related to the evaluation target company;
    generating a bar graph for comparing the risk score of the evaluation target company with an average risk score of the cooperators;
    generating a tracking graph indicating a change trend in the risk score of each of the evaluation target company and the plurality of cooperators, extracting a feature point on the tracking graph, and matching external information indicating a feature point occurrence cause to the feature point;
    creating a chat room in a third area of a chat window when an issue related to the evaluation target company occurs, the issue being occurred when the risk score of the evaluation target company is greater than a reference value or an issue occurrence keyword is included in the text data;
    transmitting access information of the chat room to a first terminal possessed by a first user of the evaluation target company and to a second terminal possessed by a second user of a target cooperator associated with the issue occurred;
    displaying specific text data related to the issue occurred in a first area of the chat window;
    generating a network diagram in which a plurality of keywords related to the evaluation target company or the cooperator are displayed in a hierarchical tree structure, and displaying the network diagram in a second area of the chat window; and
    extracting a first keyword selected by the first or second user from the specific text data displayed in the first area of the chat window, arranging the extracted first keyword at a specified center point of the second area, and arranging and displaying a plurality of sub keywords related to the first keyword in a ring shape based on the center point.

2. The method of claim 1, wherein the generating of the bar graph includes:
    setting a height of the bar graph corresponding to a size of the risk score of the evaluation target company, and displaying the risk score of the cooperator at a specified height of the bar graph corresponding to the size of the risk score of the cooperator.

3. The method of claim 1, further comprising:
    when the first or second user selects one tracking graph from a plurality of tracking graphs generated for each of the evaluation target company and the plurality of cooperators, changing at least one of color, brightness, or a thickness of the selected tracking graph.

4. The method of claim 1, further comprising:
    when the first or second user selects one feature point from a plurality of feature points formed in the tracking graph, displaying the external information matching the selected one feature point in a specified area.

5. The method of claim 4, wherein the displaying of the external information includes:
    when the first or second user sequentially selects the plurality of feature points, continuously displaying different external information matched for each selected feature point.

6. The method of claim 1, wherein the generating of the network diagram includes:
    calculating the risk score for each of the keywords based on the text data, and generating the network diagram in which the plurality of keywords are displayed in the hierarchical structure according to the calculated risk score.

7. The method of claim 1, further comprising:
    when a second keyword is selected from the plurality of sub keywords by the first or second user, arranging and displaying other sub keywords related to the second keyword in a ring shape based on the second keyword while moving and arranging the second keyword to the center point; and
    connecting and displaying the first and second keywords in a chain form while moving and arranging the first keyword to a specified outside portion in the ring shape such that history of the plurality of keywords selected by the first or second user is displayed.

8. The method of claim 1, further comprising:
    displaying an event occurrence location related to the evaluation target company on a previously stored map data based on the text data, and displaying a risk score according to the text data at the displayed location.

9. The method of claim 1, wherein the generating of the chat room includes:
    analyzing the specific text data displayed in the first area of the chat window to extract the target cooperator associated with the issue occurred.

10. A non-transitory computer readable recording medium having a computer program recorded thereon for performing a method of analyzing a risk of a cooperator supply chain, the method comprising:
    calculating a risk score of each of an evaluation target company and a plurality of cooperators related to the evaluation target company based on text data related to the evaluation target company;
    generating a bar graph for comparing the risk score of the evaluation target company with an average risk score of the cooperators;
    generating a tracking graph indicating a change trend in the risk score of each of the evaluation target company and the plurality of cooperators, extracting a feature point on the tracking graph, and matching external information indicating a feature point occurrence cause to the feature point;
    creating a chat room in a third area of a chat window when an issue related to the evaluation target company occurs, the issue being occurred when the risk score of the evaluation target company is greater than a reference value or an issue occurrence keyword is included in the text data;
    transmitting access information of the chat room to a first terminal possessed by a first user of the evaluation target company and to a second terminal possessed by a second user of a target cooperator associated with the issue occurred;
    displaying specific text data related to the issue occurred in a first area of the chat window;
    generating a network diagram in which a plurality of keywords related to the evaluation target company or the cooperator are displayed in a hierarchical tree structure, and displaying the network diagram in a second area of the chat window; and extracting a first keyword selected by the first or second user from the specific text data displayed in the first area of the chat window, arranging the extracted first keyword at a specified center point of the second area, and arranging and displaying a plurality of sub keywords related to the first keyword in a ring shape based on the center point.

11. An apparatus for analyzing a risk of a cooperator supply chain, the apparatus comprising a processor configured to:

calculate a risk score of each of an evaluation target company and a plurality of cooperators related to the evaluation target company based on text data related to the evaluation target company;

generate a bar graph for comparing the risk score of the evaluation target company with an average risk score of the cooperators;

generate a tracking graph indicating a change trend in the risk score of each of the evaluation target company and the plurality of cooperators, extract a feature point on the tracking graph, and match external information indicating a feature point occurrence cause to the feature point;

create a chat room in a third area of a chat window when an issue related to the evaluation target company occurs, the issue being occurred when the risk score of the evaluation target company is greater than a reference value or an issue occurrence keyword is included in the text data;

transmit access information of the chat room to a first terminal possessed by a first user of the evaluation target company and to a second terminal possessed by a second user of a target cooperator associated with the issue occurred;

display specific text data related to the issue occurred in a first area of the chat window;

generate a network diagram in which a plurality of keywords related to the evaluation target company or the cooperator are displayed in a hierarchical tree structure, and display the network diagram in a second area of the chat window; and extract a first keyword selected by the first or second user from the specific text data displayed in the first area of the chat window, arrange the extracted first keyword at a specified center point of the second area, and arrange and display a plurality of sub keywords related to the first keyword in a ring shape based on the center point.

* * * * *